Dec. 27, 1955 K. GEBELE 2,728,279
PHOTOFLASH SYNCHRONIZER STRUCTURE FOR
CAMERAS HAVING FOCAL PLANE SHUTTERS
Filed July 11, 1951 2 Sheets-Sheet 1

Inventor
Kurt Gebele by
Charles Shepard
Attorney

Dec. 27, 1955 K. GEBELE 2,728,279
PHOTOFLASH SYNCHRONIZER STRUCTURE FOR
CAMERAS HAVING FOCAL PLANE SHUTTERS
Filed July 11, 1951 2 Sheets-Sheet 2
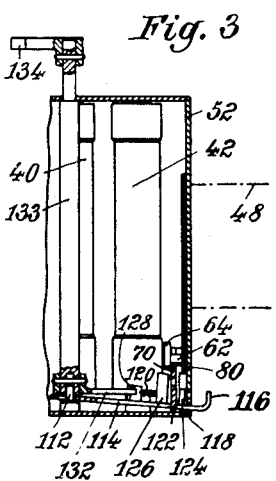
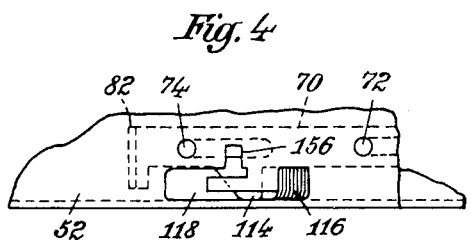
Inventor
Kurt Gebele
by
Charles Shepard
Attorney

United States Patent Office 2,728,279
Patented Dec. 27, 1955

2,728,279

PHOTOFLASH SYNCHRONIZER STRUCTURE FOR CAMERAS HAVING FOCAL PLANE SHUTTERS

Kurt Gebele, Munich, Germany, assignor to Hans Deckel and Friedrich Wilhelm Deckel, Munich, Germany Application July 11, 1951, Serial No. 236,146

Claims priority, application Germany July 19, 1950

8 Claims. (Cl. 95—11.5)

The present invention relates to a photoflash synchronizer for a photographic camera equipped with a shutter of the type usually called a focal plane shutter, known also as a curtain shutter or a slotted shutter. In cameras having such shutters, the entire field of view (exposure area of the focal plane) is uncovered at the same time only when the shutter is set for a relatively slow exposure, such as about 1/30 of a second or longer. If a picture is to be taken with a flash bulb having a very short time of illumination (for example, a stroboscopic bulb having a half-intensity illumination time of about 1/5000 of a second), difficulty is often caused in that the picture is over-exposed by dispersed light in the marginal regions, due to the long interval during which the shutter is held open when set for 1/30 of a second or longer; or on the other hand, if it is attempted to take the picture with a shorter time of exposure, only a part of the field of view or picture area of the focal plane is uncovered by the slot in the shutter curtains during the time that the flash bulb furnishes the necessary intensity of illumination, which results in only a partial exposure of the intended field of view.

To overcome these difficulties, it has been proposed to provide the camera with an auxiliary shutter of the blade type, in addition to the slotted or focal plane shutter, so that the auxiliary or blade shutter may be used when taking flashlight pictures. The difficulty with this arrangement as previously carried out is that each of the two shutters has been provided with its own separate setting and actuating members, with no satisfactory interlocking or coupling between the two shutters, so that the manipulation of the two shutters is quite cumbersome and there is too great a danger of wrongly exposed pictures in case a photographer inadvertently fails to make all of the proper adjustments necessary in connection with both shutters.

An object of the present invention is to avoid these difficulties by providing both a focal plane shutter and a blade shutter in the same camera, so coupled and interconnected to each other that dependable operation is assured.

Another object of the invention is the provision of interconnecting means between the two shutters, so designed that when the auxiliary blade shutter is readied for use in taking a flashlight picture, the focal plane shutter must be set to the proper adjustment to permit effective use of the blade shutter.

A further object is the provision of interconnecting mechanism so designed that the auxiliary blade shutter must be adjusted to a non-interfering position or condition before the focal plane shutter can be readied for normal use in taking ordinary instantaneous exposures (without flashlight).

These and other desirable objects may be attained in the manner disclosed as an illustrative embodiment of the invention in the following description and in accompanying drawings forming a part hereof, in which:

Fig. 3 is a vertical section taken across the camera body substantially on the line III—III of Fig. 1; and Fig. 4 is a fragmentary elevation of the front wall of the camera body.

The same reference numerals throughout the several views indicate the same parts.

Figs. 1-3 are of a schematic or diagrammatic character, including only so much of the camera structure as is useful in enabling an understanding of the present invention. The other features of the camera construction, not here illustrated, are well known in the art.

Figure 1:
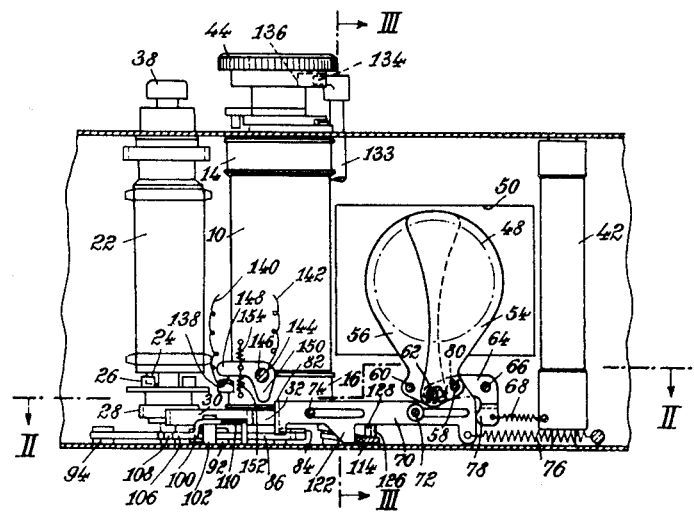
Fig. 1 is a diagrammatic vertical section through the portions of a camera necessary to an understanding of the present invention, the section being taken just inside the front wall of the camera and approximately along the line I—I of Fig. 2.

The construction of a camera having a focal plane shutter is well known, so that the usual conventional parts need not be disclosed here. It is sufficient to say that within the camera body there is a cylinder 10 onto which one end of the closing curtain 12 is wound when the shutter is being tensioned ready for an exposure, and on the same shaft with this cylinder 10 there are roller portions 14 and 16 on which the tapes of the opening curtain 18 are likewise wound when the shutter is being tensioned ready for an exposure operation. As usual, the roller portions 14 and 16 may be turned for adjustment purposes relative to the cylinder portion 10, by manipulating the time adjusting knob or button 44, thus varying the relation of the edges of the curtains 12 and 18 to each other, to vary the width of the slot formed between these two curtains, and thus to vary the time of exposure.

Figure 2:
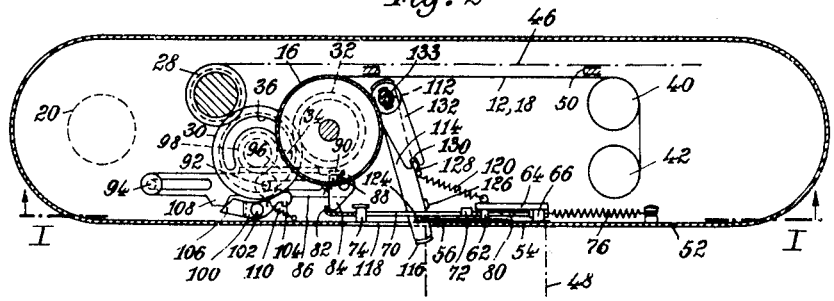
Fig. 2 is a horizontal section through the camera near the bottom thereof, the section being taken substantially along the line II—II of Fig. 1.

The winding or tensioning of the curtains is effected at the same time as the film winding or film advancing movement, by turning a knob 20 (Fig. 2) which, through conventional spur gears not shown, turns a film advancing roller 22 (Fig. 1). A clutch pin 24 on the bottom of this roller 22 normally engages a pin 26 operatively connected to a gear 28 below the roller 22, and this gear 28 meshes with a gear 30 which in turn meshes with a gear 32 operatively connected to the opening curtain rollers 14 and 16, to wind them so that the opening curtain 18 is wound up. At a somewhat later stage in the cycle of film feeding movement, the closing curtain roller or cylinder 10 is also carried along by the rotary movement so that the closing curtain 12 is likewise wound up.

This shutter winding and film advancing motion is limited by a stop pin 34 (Fig. 2) which engages in an arcuate recess 36 of the gear 30. Upon downward manual pressure on the shutter release pin 38 at the top of the camera body, the pin 26 is forced downwardly until it comes out of engagement with the pin 24, so that the opening curtain 18 can run off of the rollers 14 and 16 and be wound up on a spring tensioned roller or cylinder 40, and then the closing curtain 12 runs off of its tensioning cylinder 10 and is wound up on its spring tensioned winding cylinder or roller 42. These cylinders 40 and 42 are, of course, rotatably mounted within the camera body.

The time adjustment, that is, the adjustment of the curtain slot width determined by the difference in time of running off of the two curtains, is effected by a pawl arrangement known per se, which can be regulated as usual by the time adjustment knob 44 accessible at the top of the camera casing. When the curtains are run off, the film 46 is exposed by light entering the camera through the objective opening 48, passing through the slot in the shutter curtains, and reaching the film through the image aperture 50.

In addition to the foregoing focal plane shutter or curtain shutter of known type, there is also used an auxiliary blade shutter or segment shutter which is arranged on the inside of the front wall plate 52 of the camera casing, and which covers the objective opening 48 in a light-tight manner when this blade shutter is closed. This blade shutter comprises any desired number of blades or segments, two such blades being here shown at 54 and 56, swingably supported on pivots 58 and 60 respectively on the front plate 52 of the camera. The blades 54 and 56 are actuated by a control pin 62 which passes through slotted holes in both of these blades and which is carried by an angle lever 64 pivoted at 66 to the front plate 52 of the camera body. A tension spring 68 connected to a downwardly projecting arm of the lever 64 tends to rotate this lever 64 in a counterclockwise direction when viewed as in Fig. 1, thus constantly tending to move the control pin 62 downwardly and thus to keep the shutter blades 54 and 56 in their closed positions.

Arranged on the inside of the front plate 52 of the camera body, there is also a sliding pawl 70 guided for horizontal sliding movement in a right and left direction by means of two guide pins 72 and 74. A spring 76 secured to the right end of this pawl 70 and to a fixed pin in the casing, tends constantly to pull the pawl 70 to its right hand position. In this position, the right end of the pawl 70 engages with a portion 78 on the depending arm of the angle lever 64. On its upper edge, the pawl 70 is provided, near its right end, with a cam portion 80 which cooperates with the pin 62 to raise it and open the shutter blades 54 and 56 as the cam portion 80 moves past the pin 62, but in the normal right hand position of the pawl 70, the cam portion 80 lies to the right of the pin 62 and thus allows the pin 62 to move downwardly to close the blades.

At its left hand end, the sliding pawl 70 is provided with a rearwardly bent projection or ear 82 which is arranged to snap behind another pawl 84 which is pivotally mounted on a second slide pawl 86. A tension spring 88 (Fig. 2) normally tends to turn the pawl 84 in a counterclockwise direction to the limit position shown in Fig. 2, which is determined by the engagement of a lug 90 on this pawl, with the slide pawl 86 on which it is mounted. The slide pawl 86 is itself guided for longitudinal movement along the bottom wall of the camera by guide pins 92 and 94, and the rear edge of the pawl 86 has rack teeth 96 which engage with the teeth of a gear 98 carried on the same shaft as the gear 30 and connected thereto to rotate therewith.

Also mounted just above the bottom of the camera housing, there is a pawl 100 pivoted to the camera housing at 102 and having at its right end a locking hook 104 (Fig. 1) which can engage with and catch over the bent ear or lug 82 of the slide pawl 70, when the latter is moved to its leftward position. The other or left hand end 106 of the pawl 100 has an angularly formed or cam surface for cooperation with a projecting portion 108 on the second slide pawl 86, in a manner to be explained in more detail below. A spring 110 constantly tends to swing the pawl 100 in a clockwise direction on its pivot 102.

On the inside of the bottom wall of the camera there is a pivot pin or guide pin 112 (Figs. 2 and 3) on which is supported a control lever 114 which is provided with a slot for embracing the pin 112 so that the lever 114 may swing on the pin and also may move radially through a short distance. The free forward end of the lever projects forwardly through a slot in the front wall 52 of the camera casing and is provided, exteriorly of the casing, with an ear 116 furnishing a grip portion or manipulating portion of the lever. The casing slot through which the lever extends is indicated at 118 and has the approximate general shape of the letter U turned on its side, as seen in Fig. 4. A tension spring 120 (Fig. 2) is anchored at one end in the casing and at the other end is anchored to an intermediate point on the lever 114 in such manner that it constantly tends to swing the lever 114 in a counterclockwise direction on its pivot 112 and also to pull the lever radially forwardly relative to the pivot.

This control lever 114 cooperates with a downwardly projecting lug portion 122 (Fig. 1) on the slide pawl 70. Also, the control lever 114 has an upstanding pin 124 (Figs. 2 and 3) and also an upwardly bent projection or ear 126, for purposes to be explained below. These projections are near the forward end of the lever 114, in the vicinity of the front wall 52 of the camera casing. Further rearwardly, at an intermediate point on the length of the lever 114, is another upstanding projection 128 which engages in the forked or notched forward end 130 of a carrier lever 132 which is coupled with a vertical shaft 133 rotatably supported at its lower end on the guide pin 112. The upper end of this shaft 133 extends out through the top wall of the camera housing and carries, above the top wall, a locking lever 134 having an end which cooperates with a circumferential recess 136 extending part way around a flange portion or hub portion on the time adjustment knob 44 for adjusting the timing of the focal plane shutter. The recess or notch 136 is so placed that it lies opposite the end of the lever 134 only when the shutter control knob 44 is set to "T" or "B" positions, and in all other positions of the knob 44 there is only an unbroken or blank surface opposite the end of the lever 134, with no notch or recess for the lever to enter. Both "T" and "B" positions of the setting member 44 may be hereinafter collectively referred to as the time exposure positions thereof, while the various other possible positions may be referred to as the instantaneous positions.

The electric switch for closing the electric control circuit of the photoflash operator comprises the contact spring member 138 (Fig. 1) mounted in a stationary position in the camera casing, which is connected to the electric circuit wire 140. The other electric circuit wire 142 is connected to the angular contact lever 144 which is pivotally supported on a pivot 146 on the front wall 52 of the camera casing. The leftwardly extending arm 148 of this lever overlies the spring contact member 138 in position to make electric contact therewith when the arm 148 is depressed. The other or depending arm 150 of the switch lever extends downwardly into the path of the ear or bent end 82 on the slide pawl 70. Two springs 152 and 154 hold the contact lever 144 normally in its mid position or equilibrium position, but allow the switch lever to be displaced in either direction from this equilibrium position. The contact lever 144 and the spring contact member 138 are, of course, suitably insulated from each other, and at least one of them (preferably both of them) are insulated also from the conducting parts of the photographic camera casing.

The operation of this structure is as follows: In the position shown in the drawings, the parts are in the normal rest position which they assume after a picture has been taken. If it is now desired to make another exposure with photoflash illumination of short duration, the time adjustment knob 44 of the focal plane shutter must be turned to set this shutter for either "T" or "B," whereupon the front end 116 of the control lever 114 may be moved to the position shown in Figs. 1–4; that is, all the way to the right hand end of the lower arm of the slot 118. This right ward movement is possible because of the fact that when the shutter control knob 44 is turned to "T" or "B," the recess or notch 136 lies opposite the end of the lever 134 and allows this lever to move in a counterclockwise direction, permitting counterclockwise movement of the lever 114 to the extreme right hand position just indicated. If the shutter control knob 44 is set in some other position except "T" or "B," then the notch 136 will not be opposite the end of the lever 134, and the lever 134 cannot swing through the desired distance in a counterclockwise direction, so that the control lever 114 cannot swing to the right hand end of the slot 118.

When the control lever 114 is in this position, the slide pawl 70, 80, 82 which serves to actuate the shutter blades 54 and 56, is coupled by means of the pawl 84 with the slide pawl 86. If the winding and setting button 20 is now turned to feed the film and set the shutter ready for a new exposure, the film is fed by the roller 22 and the focal plane shutter is set or tensioned through the gears 28, 30, 32 as already described. During this motion, the gear 98 is rotated by the gear 30 to which it is coupled, and this gear 98, meshing with the rack teeth 96 of the slide pawl 86, causes a leftward displacement of this slide pawl 86. This carries leftwardly the pawl 84 which is mounted on the pawl 86, and the latter in turn, by its engagement with the ear 82 on the slide pawl 70, moves the slide pawl 70 in a leftward direction, tensioning the spring 76, until the projection 82 is engaged and held by the hook-like end 104 of the locking pawl 100. This terminates the feeding motion of the film and the cocking of the focal plane shutter, as well as the cocking of the auxiliary blade shutter.

During the cocking of the auxiliary shutter, the operating cam 80 of this shutter (on the upper edge of the slide pawl 70) momentarily raises the pin 62 of the shutter blades and effects a momentary opening and closing of the shutter blades, but this is not detrimental for the reason that the focal plane shutter remains closed at this time. Also during this cocking or tensioning movement, the ear 82 of the slide pawl 70 engages the downwardly projecting tail 150 of the electric contact lever 144 and swings this lever in a clockwise direction on its pivot 146, but this raises the arm 148 away from the contact spring 138 and so does not close the electric circuit. When the ear 82 passes beyond the depending tail 150 of the contact lever, the springs 152, 154 bring the contact lever back to its neutral or equilibrium position.

If the shutter release button or plunger 38 is now actuated downwardly to make an exposure, the opening curtain 18 of the focal plane shutter unwinds or opens up in the usual manner, but the closing curtain 12 is still maintained in its fully open position inasmuch as the timing control knob 44 is set necessarily to either "B" or "T." During the winding movement of the opening curtain 18, the gears 32 and 30 are rotated, so that the gear 98 also rotates and the rack 96 of the pawl 86 is actuated to move the slide pawl 86 rightwardly. Near the end of the rightward movement of this pawl, the projection 108 thereon comes into contact with the cam surface of the tail 106 of the locking pawl 100 and swings this locking pawl slightly so that the hook end 104 thereof releases the ear 82 of the slide pawl 70, whereupon the spring 76 may draw the slide pawl 70 rightwardly. During this rightward movement of the pawl 70, its cam 80 engages the pin 62 of the shutter blades and raises this pin to open the shutter blades, and as soon as the cam has passed from beneath the pin 62, the blades are closed jointly by the action of the spring 68 and by the action of the right hand end of the pawl 70 hitting against the portion 78 of the lever 64 to assist the spring 68 in turning the lever 64 in a counterclockwise direction to close the shutter blades. The timing of the blade shutter is constant (for example, about 1/300 of a second) but is adequate for the necessary flashlight exposure.

During this rightward movement of the slide pawl 70, and just at the moment that the cam 80 has shifted the pin 62 upwardly to open the shutter blade to maximum opening, the ear 82 on the pawl 70 swings the tail 150 of the switch lever 144 in a rightward direction to swing the contact arm 148 of the switch lever down into contact with the contact spring member 138. This closes the flashlight circuit of which the wires 140 and 142 are a part, which circuit runs to a suitable source of electric power and to a suitable flash bulb (for example, a stroboscopic bulb) so that the flash takes place at the moment that the auxiliary shutter blades are fully open, and at this time the focal plane shutter or curtain shutter is likewise fully open, as above explained.

When the shutter operating plunger 38 is then released (if the shutter has been set for a bulb exposure) or when it is actuated a second time (when the shutter has been set for a time exposure), the closing curtain of the focal plane shutter is wound to its closed position in the usual manner, so that the entire operation is terminated. The parts are now back in the position shown in the drawings.

If a picture is to be taken without a flashlight, the duration of exposure should be controlled by the focal plane shutter rather than by the auxiliary shutter, and the blades of the auxiliary shutter should be fully open during the time of the exposure. This can be done by maintaining the auxiliary blades continuously open when the camera is set for operation with the focal plane shutter, or by opening them just before the exposure and closing them just after the exposure. In the preferred form as here shown, the blades of the auxiliary shutter are maintained continuously open. For this purpose, the control lever 114 is manually moved toward the left from the position shown in Figs. 2 and 4, moving it leftwardly along the lower leg of the slot 118, then pulling it upwardly when it reaches the wide left end of the slot, and finally moving it back again towards the right by a small amount, in the upper leg of the U-shaped slot, until the pin 124 on the lever 114 is opposite a recess 156 in the front plate 52 of the camera. This recess, as seen in Fig. 4, opens at its bottom into the upper leg of the U-shaped slot 118. When the pin 124 comes opposite the recess 156, the spring 120 can now pull the lever 114 slightly forwardly or in a radial forward direction relative to its pivot pin 112, the pin 124 thus coming forwardly through or partially through the notch or recess 156. Due to this forward motion of the lever 114, the projection 126 on the lever presses forwardly against the rear face of the slide pawl 70, and slightly bends or flexes this pawl 70 or swings it on the guide pin 72 so that the left hand end of the pawl 70 presses against the inside surface of the front plate 52 of the camera and the ear 82 is moved forwardly out of the path of the pawl 84. In this way, because the ear 82 is moved out of the path of the pawl 84, the actuation of the auxiliary shutter from the actuation of the main or focal plane shutter is disconnected or rendered ineffective. At the same time, the position of the control lever 114, pressing against the portion 122 of the slide pawl 70, holds this slide pawl a little to the left of its normal rest position shown in Figs. 1 and 2, so that the cam 80 remains directly under the control pin 62 of the auxiliary shutter, maintaining the blades of the auxiliary shutter in full open position.

In case it is desired to shift the control lever 114 to disconnect the auxiliary shutter in this way, after the shutter has been set or tensioned ready for an exposure, the control lever 114 is moved in exactly the same way as above mentioned, and the same result is achieved. The only difference is that, at the beginning of this disconnecting operation, the slide pawl 70 is already in its leftward tensioned position, so that when the projection 126 on the control lever 114 presses forwardly against the pawl 70 and deflects the left end of the pawl forwardly, it becomes disengaged from the pawl 104 and the spring 76 will then pull the slide pawl 70 rightwardly until the pawl is stopped by engagement of the part 122 with the edge of the control lever 114, in which position the blades of the auxiliary shutter are fully open.

If it is now desired to adjust the camera for a flashlight exposure, a similar action takes place in reverse. The control lever 114 is first pushed backwardly or rearwardly into the camera body to release the pin 124 from the notch or recess 156, and then the control lever is moved leftwardly through the upper leg of the slot 118, then downwardly in the wide left end of the slot 118, then rightwardly to its extreme right hand position in the lower leg of the slot 118. During the leftward movement of the control lever, it presses leftwardly on the projection 122 of the pawl 70 and thus moves this pawl all the way to the left hand limit of its travel, so that the lug 82 thereon catches on the nose 104 of the locking pawl 100 if the focal plane shutter is already in set or tensioned condition. If the focal plane shutter is not already set or tensioned, the pawl 70 does not stay in the left hand position but follows along with the subsequent rightward movement of the control lever 114. It will be understood that because of the relation of the notch or recess 136 to the end of the lever arm 134, the control lever 114 can be moved to its extreme rightward position only when the focal plane shutter has been adjusted for a time exposure or a bulb exposure, and thus it is insured that the operator cannot accidentally set the parts for use of the auxiliary shutter in taking a flashlight picture, unless he has previously set the focal plane shutter to "T" or "B," as is necessary for effective use of a flashlight of very short duration.

As already mentioned, the number of blades used in the auxiliary shutter is immaterial for purposes of the present invention, as a shutter of more or less than the two blades here illustrated can be used. Also, as above indicated, it is not necessary that the auxiliary shutter be maintained continuously open when the camera is set for normal use of the focal plane shutter, for it is possible according to the present invention to have the mechanism open the auxiliary shutter blades immediately prior to the running off or winding of the curtains of the focal plane shutter, and shut the auxiliary shutter blades immediately after the completion of the movement of the curtains of the focal plane shutter.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a shutter of the focal plane type, an auxiliary shutter of the pivoted blade type, a reciprocating operating slide mounted for movement in a first direction to open and close said auxiliary shutter and for movement in a second direction to prepare it for movement in said first direction, a spring tending to move said slide in said first direction, a latch for holding said slide at the end of its movement in said second direction, means for initiating opening movement of said focal plane shutter, means operated by opening movement of said focal plane shutter for releasing said latch, an electric photoflash circuit including a switch, means operated by movement of said slide in said first direction for closing the switch in predetermined timed relation to the operation of said auxiliary shutter, a control member movable to a first position out of the path of travel of said slide to allow movement of said slide in said first direction to open and close said auxiliary shutter so as to render said auxiliary shutter effective to determine the duration of an exposure and movable to a second position holding said slide in a position wherein said auxiliary shutter is maintained open so as to render said auxiliary shutter ineffective in determining the duration of an exposure, a setting member movable to one position for conditioning said focal plane shutter for instantaneous exposures and movable to another position for conditioning said focal plane shutter for non-instantaneous exposures, and interconnecting means locking said setting member against movement from non-instantaneous position to instantaneous position when said control member is in its said first position.

2. A photographic camera including a shutter of the focal plane type, an auxiliary shutter of the pivoted blade type built into the camera as an integral part thereof, a spring-biased operating member movable in a shutter-operating direction to open and close said auxiliary shutter and movable in an opposite direction to a tensioned position ready for shutter-operating movement, an electric photoflash circuit including a switch having a part lying in the path of said operating member to be moved thereby to close the switch during travel of said operating member in said shutter-operating direction, a setting member for selectively setting said focal plane shutter for instantaneous exposures and for time exposures, a control member engageable with said operating member and selectively settable to a first position in which said operating member may make full movement in both of said directions and a second position maintaining said operating member in a position in which said auxiliary shutter is open, and interlocking surfaces on said setting member and said control member for holding said control member against movement from its second position to its first position except when said setting member is set for a time exposure and for holding said setting member against movement from time exposure position to instantaneous exposure position except when said control member is in its said second position.

3. A construction as defined in claim 2, further including a manually operable rotary member for tensioning said focal plane shutter to prepare it for making an exposure, an auxiliary shutter tensioning member movable in a direction substantially parallel to the movement of said operating member, gearing operatively connecting said rotary member to said auxiliary shutter tensioning member to move the latter from rotary tensioning movement of the former, and a part on said auxiliary shutter tensioning member for engaging said operating member when said operating member is at the end of its travel in a shutter-operating direction and when said control member is in said first position, to move said operating member in said opposite direction by the movement of said auxiliary shutter tensioning member when said rotary member is turned to tension said focal plane shutter.

4. A construction as defined in claim 3, in which said control member, when in said second position, displaces said operating member out of the path of travel of said part on said auxiliary shutter tensioning member.

5. A construction as defined in claim 2, in which said setting member is rotatable to set it for different kinds of exposures, and in which said interlocking surfaces on said setting member and control member include an approximately circular surface on said setting member having a recess therein at one point, and an arm on said control member entering said recess when said control member is moved from second position to first position while said setting member is set for a time exposure.

6. A photographic camera including a shutter of the focal plane type, an auxiliary shutter of the pivoted blade type built into the camera as an integral part thereof, a spring-biased operating member movable in a shutter-operating direction to open and close said auxiliary shutter and movable in an opposite direction to a tensioned position ready for shutter-operating movement, a manually operable rotary member for tensioning said focal plane shutter to prepare it for making an exposure, means operatively connecting said operating member to said rotary member to move said operating member in said opposite direction upon tensioning movement of said rotary member, thereby to tension said operating member of said auxiliary shutter by the act of tensioning said focal plane shutter, a latch for holding said operating member in tensioned position, a shutter release member for releasing the tensioned focal plane shutter for making an opening movement, said focal plane shutter including a curtain roller rotated upon opening movement of the shutter, and means operated by rotary movement of said curtain roller during opening movement of said focal plane shutter for releasing said latch to free said operating member to move in a shutter-operating direction to open and close said auxiliary shutter.

7. A photographic camera including a main shutter of the focal plane type, an auxiliary shutter of the pivoted blade type, both shutters being permanently built into the camera, each having parts movable in one direction for tensioning the shutter preparatory to an exposure movement and movable in another direction to open and close the shutter for an exposure movement, means for concomitantly moving said parts of both shutters to tension both shutters concomitantly, a movable control member shiftable to a first position when it is desired to have an exposure timed by said auxiliary shutter and shiftable to a second position when it is desired to have an exposure timed by said main shutter, means effective when said control member is in its second position for holding said auxiliary shutter open so that an exposure may be timed by the opening and closing of said main shutter, selectively settable means for determining the time interval between opening and closing of said main shutter, said selectively settable means being settable to a time exposure position causing an extended interval of time between opening and closing of said main shutter, and blocking means for holding said control member against movement from second position to first position when said selectively settable means is in a position other than said time exposure position and for holding said selectively settable means against movement away from said time exposure position when said control member is in said first position.

8. A photographic camera including main shutter of the focal plane type, an auxiliary shutter of the objective type, both shutters being permanently built into the camera and both requiring to be tensioned before making an exposure, auxiliary shutter operating means including an operating member movable from a first position to a second position to open said auxiliary shutter and movable from said second position to a third position to close said auxiliary shutter, said auxiliary shutter remaining open as long as said operating member remains in said second position, a main shutter tensioning member, a main shutter release member, a main shutter timing adjustment member selectively settable to a plurality of different timing positions including an instantaneous exposure position and a time exposure position, an auxiliary shutter control member movable between a first position in non-obstructing relation to said operating member and a second position, means for holding said operating member in its said second position when said auxiliary shutter control member is in its second position, means for holding said main shutter timing adjustment member in its time exposure position when said auxiliary shutter control member is in its first position, means for holding said auxiliary shutter control member in its second position when said main shutter timing adjustment member is in its instantaneous exposure position, and means operated by said main shutter tensioning member for tensioning said auxiliary shutter when said auxiliary shutter control member is in its first position.

References Cited in the file of this patent

UNITED STATES PATENTS

| | | | |
|---|---|---|---|
| 2,308,725 | Steiner | Jan. 19, | 1943 |
| 2,517,407 | Nilsen | Aug. 1, | 1950 |
| 2,520,638 | Hulstein | Aug. 29, | 1950 |
| 2,525,160 | Walker | Oct. 10, | 1950 |
| 2,541,413 | Gorey | Feb. 13, | 1951 |